(12) United States Patent
Tamaki et al.

(10) Patent No.: US 7,301,989 B2
(45) Date of Patent: Nov. 27, 2007

(54) WIRELESS COMMUNICATION SYSTEM AND TRANSMIT POWER AND DATA RATE CONTROL METHOD THEREFOR

(75) Inventors: Satoshi Tamaki, Kokubunji (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 733 days.

(21) Appl. No.: 10/641,059

(22) Filed: Aug. 15, 2003

(65) Prior Publication Data

US 2004/0176033 A1 Sep. 9, 2004

(30) Foreign Application Priority Data

Mar. 3, 2003 (JP) ............................. 2003-055093

(51) Int. Cl.
*H04B 1/00* (2006.01)
(52) U.S. Cl. ...................................... 375/146; 375/226
(58) Field of Classification Search ................ 375/146, 375/226
See application file for complete search history.

(56) References Cited

U.S. PATENT DOCUMENTS

| | | | |
|---|---|---|---|
| 4,688,207 A | 8/1987 | Yoshimoto | |
| 5,267,262 A | 11/1993 | Wheatley, III | |
| 5,396,516 A | 3/1995 | Padovani et al. | |
| 5,548,807 A | 8/1996 | Ueda | |
| 5,559,790 A | 9/1996 | Yano et al. | |
| 6,035,210 A | 3/2000 | Endo et al. | |
| 6,341,214 B2 | 1/2002 | Uesugi | |
| 6,415,137 B1 | 7/2002 | Hayashi | |
| 6,636,723 B1 | 10/2003 | Kitagawa et al. | |
| 6,763,244 B2 | 7/2004 | Chen et al. | |
| 6,917,599 B2 | 7/2005 | Kono | |
| 6,959,199 B2 | 10/2005 | Ohkubo et al. | |
| 2001/0004374 A1 | 6/2001 | Kono | |
| 2002/0046379 A1 | 4/2002 | Miki et al. | |
| 2004/0018850 A1 | 1/2004 | Ishiguro et al. | |
| 2004/0176033 A1 | 9/2004 | Tamaki et al. | |
| 2004/0208232 A1* | 10/2004 | Sudo | 375/146 |
| 2005/0094550 A1* | 5/2005 | Huh et al. | 370/203 |

FOREIGN PATENT DOCUMENTS

| | | |
|---|---|---|
| EP | 977371 | 2/2000 |
| EP | 1067729 | 1/2001 |
| EP | 1071223 | 1/2001 |
| EP | 1111810 | 6/2001 |
| EP | 1128577 | 8/2001 |
| JP | 10-215219 | 8/1998 |
| JP | 2000-78029 | 3/2000 |

(Continued)

*Primary Examiner*—David C. Payne
*Assistant Examiner*—Nader Bolourchi
(74) *Attorney, Agent, or Firm*—Mattingly, Stanger, Malur & Brundidge PC (57) ABSTRACT

When channel-coded data is transmitted in a wireless communication system, coded data is divided into a plurality of bandwidths and the signal power is distributed to the bandwidths so that the communication channel capacity is increased. In addition, the transmission power is controlled on a time basis in such a way that the average power becomes larger when the channel quality is poorer so that the quality of each code word is stabilized. Alternatively, the coding rate is controlled in such a way that the data rate is decreased when the channel quality is poorer.

20 Claims, 9 Drawing Sheets

FOREIGN PATENT DOCUMENTS

| | | |
|---|---|---|
| JP | 2001-177471 | 6/2001 |
| JP | 2001-186102 | 7/2001 |
| JP | 2002-9741 | 1/2002 |
| JP | 2002-521886 | 7/2003 |
| WO | 9631009 | 10/1996 |
| WO | 9907105 | 2/1999 |
| WO | 4728 | 1/2000 |
| WO | 01/43296 | 6/2001 |

* cited by examiner

WIRELESS COMMUNICATION SYSTEM AND TRANSMIT POWER AND DATA RATE CONTROL METHOD THEREFOR

CROSS-REFERENCES TO RELATED APPLICATIONS

The present application relates to subject matters described in co-pending application Ser. No. 10/287,676 filed on Nov. 5, 2002 by the same applicants of the present application and Ser. No. 10/331,769 filed on Dec. 31, 2002 by the same applicants of the present application. The disclosures of these applications are incorporated herein by reference.

BACKGROUND OF THE INVENTION

The present invention relates to a transmission power setting method, a data rate control method, and a reception method for use in a radio station in a wireless communication system that uses a broadband where the channel quality in a bandwidth tends to distribute unevenly and that uses a channel code.

To achieve a desired reception quality in a wireless communication system, a technology for controlling the transmission power of a wireless communication device is known. For example, U.S. Pat. No. 5,267,262 discloses a technology for allowing a base station to measure a signal reception power from a terminal and issue a transmission power increase instruction to a mobile terminal station when the measured power value is smaller than a desired value or a transmission power decrease instruction to a mobile station when the measured power is greater than a desired value, and for allowing a mobile station to control the transmission power according to the above-mentioned transmission power control instruction, thereby ensuring that the power received by the base station is virtually constant.

Another technology, which is disclosed by U.S. Pat. No. 5,559,790, is for enabling a mobile station to measure the reception quality of a pilot signal transmitted by a base station at a known power level and, based on the measurement result, to transmit a transmission power control signal to the base station so as to request a higher transmission power when the reception quality is poorer than when the reception quality is adequate and, at the same time, allowing the base station to control the transmission power for a signal directed to the mobile station in accordance with the transmission power control signal, thereby ensuring that the quality of received signals sent from the base station to the mobile station is maintained virtually constant for the mobile station.

The above technologies make it possible to provide consistent reception quality by maintaining the power received by a receiving station constant and avoid reception quality deterioration due to channel gain fluctuation and intra-system interference due to unduly high transmission power.

In a broadband communication system, the channel reception quality may vary according to the bandwidth because of the effects such as frequency selectivity noises and multipath interference. In such a case, there is a potential technology for performing communication at a usable data rate according to the quality of the channel of each bandwidth. In addition, JP-A-2001-186102 discloses a technology that measures noises in each bandwidth to select a bandwidth to which the transmission power is to be allocated, allocates data to the selected bandwidth to save power, and performs communication at a data rate usable for each bandwidth.

SUMMARY OF THE INVENTION

To increase the communication capacity of a whole communication system, it is desirable that the transmission power be as small as possible because a communication tends to interfere with another communication that is performed at the same time. It is also desirable that the coding method and the modulation method be selected to allow data to be transmitted at a data rate at which a large amount of information can be communicated per predetermined power.

On the other hand, it is difficult for the method of a conventional technology to decrease more transmission power than a predetermined amount because the method controls the transmission power so that constant reception quality is ensured in order to provide reliable communication in a channel where the quality fluctuates.

To prevent a communication error from occurring even when the channel quality fluctuates, it is necessary to select a low-data-rate coding method and modulation method that allows good-quality communication to be performed even in a somewhat poor channel.

When data is transmitted to a receiving station using a plurality of frequency bandwidths, a bandwidth to which data is allocated is changed based on the measurement result of the channel according to the method of the conventional technology. The problem with this method is that the transmission/reception means become complicated and it becomes difficult to follow a fluctuation in the quality of a high-speed channel because the receiver must know, in advance, a bandwidth to which data is to be allocated in order to change data allocation to a bandwidth or to receive data.

It is an object of the present invention to provide relatively simple transmission/reception means, for use in a channel where the quality fluctuates, that distribute power to a bandwidth according to a channel, that decrease the total amount of transmission power for the transmission data amount to decrease interference with other communications, and that increase the information amount that can be communicated by a predetermined power and thereby increase the communication capacity of the whole system.

The error correction capability of a channel code eliminates the need for making constant the reception quality of the symbols in a code word where the error correction capability of the channel code is effective. This makes it possible to achieve the best communication characteristics when the information amount usable at channel code decoding time is maximized. On the other hand, because the error correction capability does not work across code words, the quality must be stabilized on a code word basis.

Therefore, when performing communication across a wide frequency bandwidth, signals coded with a channel code are allocated across a plurality of bandwidths as symbols, the signal power is controlled at each time in such a way that the communication channel capacity is increased and, in the time direction, in such a way that the signal transmission power is increased when the quality of the communication channel is poorer to stabilize the communication quality of each code word.

In particular, when the speed of a fluctuation in the quality of a communication channel is low, signals coded with a channel code are allocated across a plurality of bandwidths as symbols, the signal power is controlled at each time in such a way the communication channel capacity is increased and, in the time direction, in such a way the average signal transmission power becomes constant.

In addition, when a fluctuation in communication speed is allowed as in data communication, signals coded with a channel code are allocated across a plurality of bandwidths as symbols and the signal power is controlled in such a way that the communication channel capacity is increased in the whole communication while accepting variations in quality.

In this case, the information amount transmittable per transmission power in the whole communication can be increased by controlling the data rate and changing the error correction capability of the code based on the measured channel quality or on the communication quality fed back from the receiver.

For example, in an environment where the quality of a channel used for transmission can be estimated from the quality of received signals as in the TDD (Time Division Duplex) mode in which the same bandwidth is time-divided for duplexing transmission and reception, the present invention can be applied by sending signals, whose transmission power is known, from a receiving station to a transmitting station to allow the transmitting station to judge the channel quality from the reception quality of the signals for use in controlling the signal power setting.

When the quality of a channel used for transmission is not estimated from the quality of received signals as in the FDD (Frequency Division Duplex) mode in which transmission and reception are duplexed using different bandwidths, the present invention can be applied by sending signals, whose power is known, from a transmitting station to a receiving station to allow the receiving station to judge the channel quality based on the reception quality of the signals and by sending quality information to the transmitting station to allow the transmitting station to control the signal power setting in the radio zone based on the quality information.

Other objects, features and advantages of the invention will become apparent from the following description of the embodiments of the invention taken in conjunction with the accompanying drawings.

DESCRIPTION OF THE EMBODIMENTS

First, a transmission power setting method used in the present invention will be described.

In the description below, log2 (x) means the logarithm to the base 2 and log (x) is the natural logarithm of x.

It is known that the capacity C of a communication channel with the frequency bandwidth of W is represented by $C=W\log2(1+S/N)$ where S is a signal power and N is a noise power.

The increase rate with respect to an increase in the small signal power of the capacity, which is represented by $dC/dS=W/(\log(2)\cdot(S+N))$, is in inverse proportional to the sum of the signal power and the noise power. That is, when increasing the signal power, the capacity can be increased the most when the signal power is added at a bandwidth or a time when the sum of the signal power and the noise power is the minimum.

This relation is called the Principle of Water Pouring. When the noise power varies according to a bandwidth or a time, the communication channel capacity per average transmission signal power can be increased by measuring the noise power and then setting the power so that the sum of the measured noise power and the signal power (hereinafter called reference power) becomes constant at each bandwidth or time. The reference power required to obtain the reception information amount necessary for correctly receiving transmission data is determined, for example, by the error correction capability of a code used for coding. Alternatively, it is possible to feed back information on the reception status from the receiving station and, when the reception information amount is insufficient, to increase the reference power.

Figure 1:
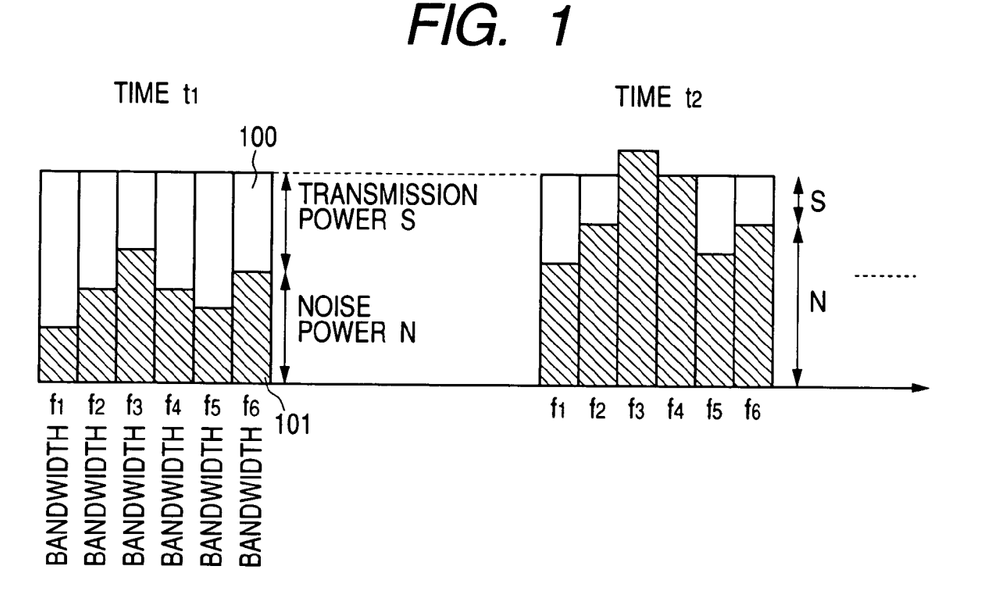
FIG. 1 is a diagram showing an example of transmission signal power distribution according to the present invention.

FIG. 1 shows how the signal power is set for a bandwidth and a time based on the principle described above. In the figure, a blank rectangle 100 indicates a signal power and a shaded rectangle 101 indicates the noise power at a specific bandwidth and at a specific time.

Because a negative value cannot be assigned to the signal power, the power is not allocated at a bandwidth or a time where the noise power is very large. For other bandwidths and times, the communication channel capacity is maximized by allocating power so that the sum of the signal power and the noise power becomes constant.

Although power allocation according to the noise power is shown in FIG. 1, it is possible to apply this relation to a fluctuation in a channel gain caused by fading and so on. That is, the communication channel capacity described above is represented by $C=W\log2(1+T\cdot G/N)$ where T is the signal transmission power and G is the channel gain.

Therefore, the increase rate of the capacity with respect to an increase in the small signal transmission power is represented by $dC/dT=W/(\log(2)\cdot(T+N/G))$. By equivalently treating the value, generated by dividing the noise power by the channel gain, as the noise power, a fluctuation in the channel gain is treated equivalently as a fluctuation in the noise power.

In this case, the communication channel capacity per average transmission signal power can be increased by measuring the fluctuating channel gain and the noise power and then controlling the signal transmission power so that the sum of the quotient, generated by dividing the noise power by the channel gain, and the signal transmission power becomes constant. This, in turn, increases the communication channel capacity of the whole system.

In addition, when the fluctuation in the noise power is sufficiently small, the similar control may be performed by treating the fluctuation in the inverse number of the channel gain equivalently as the fluctuation in the noise power. Therefore, in the description below, this equivalent noise power is treated as the noise power.

Although the Principle of Water Pouring is used as the principle of power control in the above description, the present invention also includes some other control rule if the rule stipulates that the signal power is decreased at a large-noise-power bandwidth or time and, instead, the signal power at a small-noise-power bandwidth and time is increased to increase the communication channel capacity per transmission power.

Figure 2:
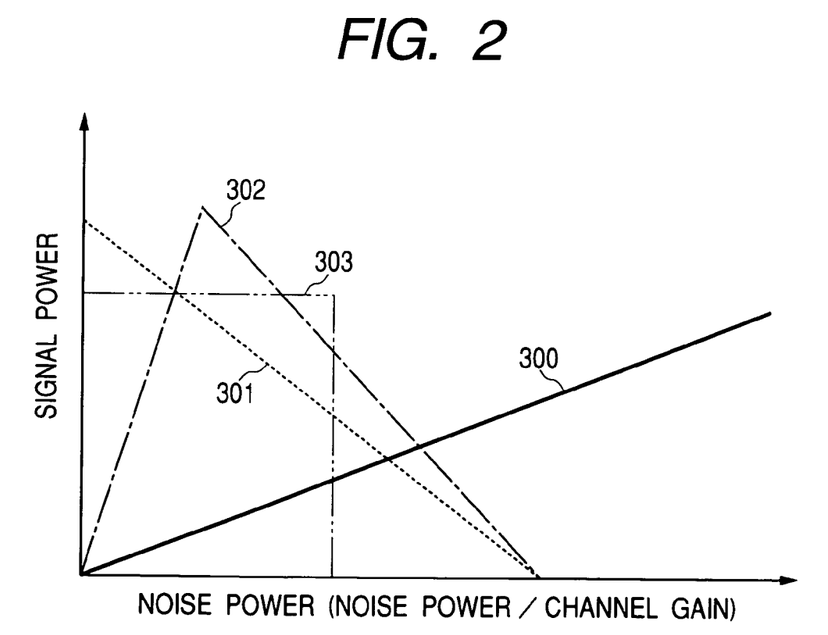
FIG. 2 is a diagram showing an example of the relation between the noise power and the transmission signal power.

FIG. 2 shows the relation between the noise power and the signal power for each power control method.

A solid line 300 indicates a power control method by which the quality is stabilized by making constant the S/N ratio at a receiving end as in a conventional system. The quality at each bandwidth and time is stabilized by using the signal power that is in proportion to the noise power.

On other hand, a broken lien 301 indicates a relation between the noise power and the signal power when the Principle of Water Pouring is applied. In contrast to the conventional control method, the communication channel capacity per signal power may be increased by increasing the signal power as the noise power becomes smaller and by setting the signal power to 0 when the noise power becomes equal to or higher than a predetermined value.

When the noise power becomes equal to or higher than a predetermined value as indicated by a chain line 302, the control similar to the Principle of Water Pouring is performed; that is, the effect of communication channel capacity increase can be achieved by decreasing the signal power when the noise power is equal to or lower than a predetermined value while preventing the signal power from being concentrated extremely.

When the noise power is equal to or higher than a predetermined value as indicated by a chain double-dashed line 303, the almost similar effect of communication channel capacity increase can be achieved also by combining the above control with the control rule stipulating that the signal power be set to 0.

When transmitting data via wireless communication, coding via a channel code is usually performed. By coding fixed-length data using a channel code with a sufficient correction capability and then interleaving the coded data, the characteristics of received signals after demodulation depend on the reception information amount of the whole code word represented by expression 1 rather than on the reception quality of each symbol in the code word, for example, the S/N ratio.

$$I_m = k\Sigma \log(1+SNR(i)) \quad (1)$$

where, k is a proportionality constant, SNR(i) is the reception S/N ratio of symbol i in the code word, and $I_m$ is the value proportion to the total sum of the communication channel capacity calculated from the S/N ratio of all symbols in the code word. Therefore, when using a channel code, it is desirable that control be performed so that transmittable information amount, that is, communication channel amount, is increased instead of stabilizing the reception quality of each symbol in the code word.

By contrast, because the error correction capability of the channel code does not work across code words, it is desirable that control be performed so that the quality is stabilized for each code word.

Figure 12:
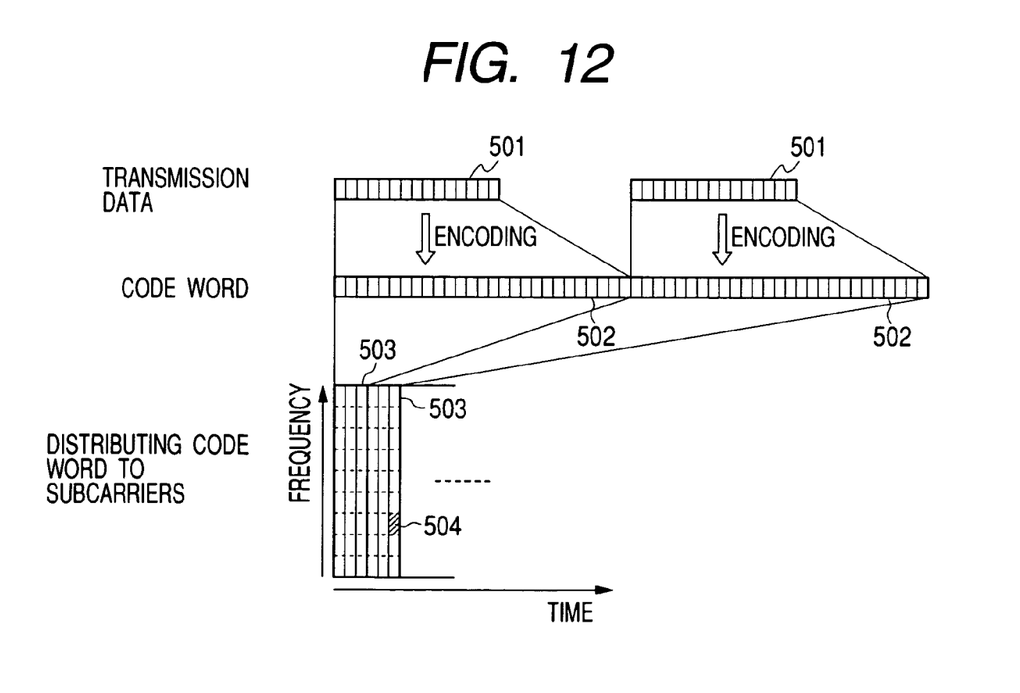
FIG. 12 is a diagram showing the concept of communication using subcarriers.

FIG. 12 shows an example in which a code word, created by coding transmission data using a channel code, is divided into a plurality of subcarriers in order to take advantage of the characteristics described above. Transmission data 501 is coded using a channel code and then converted to a code word 502. The code word 502 is divided into a plurality of subcarriers as indicated by 503 through series-parallel conversion. The divided signals are modulated for communication in the OFDM (Orthogonal Frequency Division Multiplexing) mode in which the subcarrier's are orthogonal to one another through inverse-FFT (inverse Fourier Transform).

Figure 3:
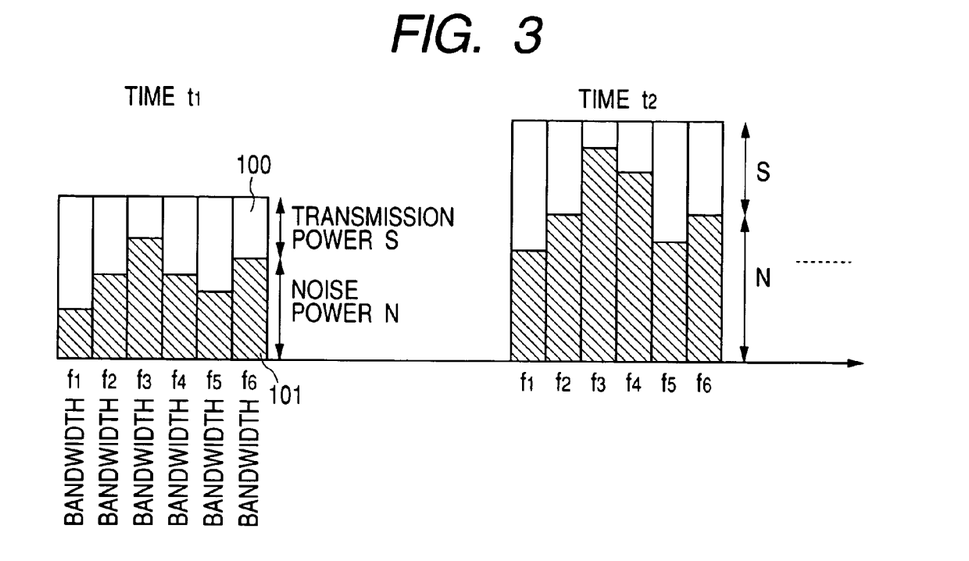
FIG. 3 is a diagram showing an example of transmission signal power distribution according to the present invention.

FIG. 3 shows an example of power distribution in which an increase in the communication channel capacity in a code word is made consistent with the quality stabilization of a code word. Data coded using a channel code is divided for communication in different bandwidths. Power is distributed among bandwidths at each time so that the communication channel capacity is increased while the total sum of the signal transmission power required at each time is distributed with a positive correlation with the noise power. For example, the reference power, which is the sum of the noise power and the signal transmission power, is determined for each code word.

However, the total sum of the signal power at each time need not be controlled at that time. For example, if the code length of a channel code is sufficiently short for the speed of the fluctuation in the channel, the power distribution need not be changed while the same code word is transmitted. Also, if the period from the start of communication to the end is short, for example, in packet communication, and there is not a great fluctuation in the channel during that period, the same effect may be achieved by continuing communication using the power distribution established when the communication was started. This is because data is received correctly if the reception information amount of the whole code word is equal to or higher than a predetermined value.

It is also possible to implement the stabilization of the quality of each code word by changing the error correction capability of the code.

The error correction capability of a code is determined usually by the data rate of signals before coding per one bit of coded signals (coding rate). The higher the data rate (coding rate) is, the lower the correction capability is; the lower the data rate (coding rate) is, the higher the correction capability is.

By taking advantage of the characteristics described above, the optimum data rate can be selected according to the quality of the channel for reliable communication though there is a fluctuation in the data rate. This is accomplished in one of two methods. In one method, the data rate is set low if the quality is low, and the data rate is set high if the quality is good, based on the measured quality of the channel. In the other method, the receiver feeds back the quality of communication to the transmitter and requests to decrease the data rate, that is, to increase the code length (decrease the coding rate) if, for example, the demodulation has failed.

Thus, by setting the signal power always to increase the communication channel capacity regardless of bandwidths and times as shown in FIG. 1, communication can be performed reliably and the throughput of the whole system can be increased though the data rate fluctuates with the time.

The following describes a control method and the configuration of a radio station according to the present invention and the operation of the modules with reference to the drawings. In the description below, a station that transmits data signals using the present invention is called a transmitting station and a station that receives the data signals is called a receiving station. Although the following describes a configuration in which the present invention is applied to the communication of data signals from the transmitting station to the receiving station, the present invention may be applied also to the communication of data signals in both directions, that is, from the transmitting station to the receiving station and from the receiving station to the transmitting station.

To perform the power control described above, the channel gain or the noise power is measured to judge the equivalent noise and control is performed based on the judgment result. The power is controlled in one of two methods. In one method, the transmitting station measures the equivalent noise of the channel from the receiving station to the transmitting station to control the transmission power of the transmitting station. In the other method, the receiving station measures the equivalent noise of the channel from the transmitting station to the receiving station and notifies the transmitting station of the measurement result, and the transmitting station controls the transmission power based on the notified measurement result.

To measure the equivalent noise that is used in the control, a signal whose transmission power is fixed or known is transmitted to the equivalent-noise measuring station, and the measuring station compares the received power with the fixed or known transmission power to estimate the channel gain. If the equivalent-noise measuring station does not know the transmission power, the transmission power is also notified. Then, the measuring station can compare the notified transmission power with the measured reception power to estimate the channel gain and measure the equivalent noise. In addition, this control can also be performed by the relative relation, not by the absolute value of the equivalent noise. Therefore, it is also possible that the signals, whose transmission power ratio among signals is fixed, to the measuring station and that the station that measures the channel gain measures the relative relation among channel gains from the reception power ratio among the signals for use in the control. Because the data transmission power is controlled for each frequency bandwidth and for each time in accordance with the present invention, the channel status is judged for each frequency bandwidth and for each transmission time.

In the description below, the signal used for measuring the equivalent noise is called a pilot signal. The data signal or other control signals, whose transmission power or the transmission power ratio among signals can be estimated, can also be used as the pilot signal. This pilot signal may be transmitted for each frequency bandwidth or may be shared by a plurality of frequency bandwidths.

The processing flow and the configuration of a first embodiment will be described below with reference to the drawings. In the embodiment, the control according to the present invention is implemented by the transmitting station that measures the equivalent noise from the received signal for use in controlling the transmission signal.

Figure 4:
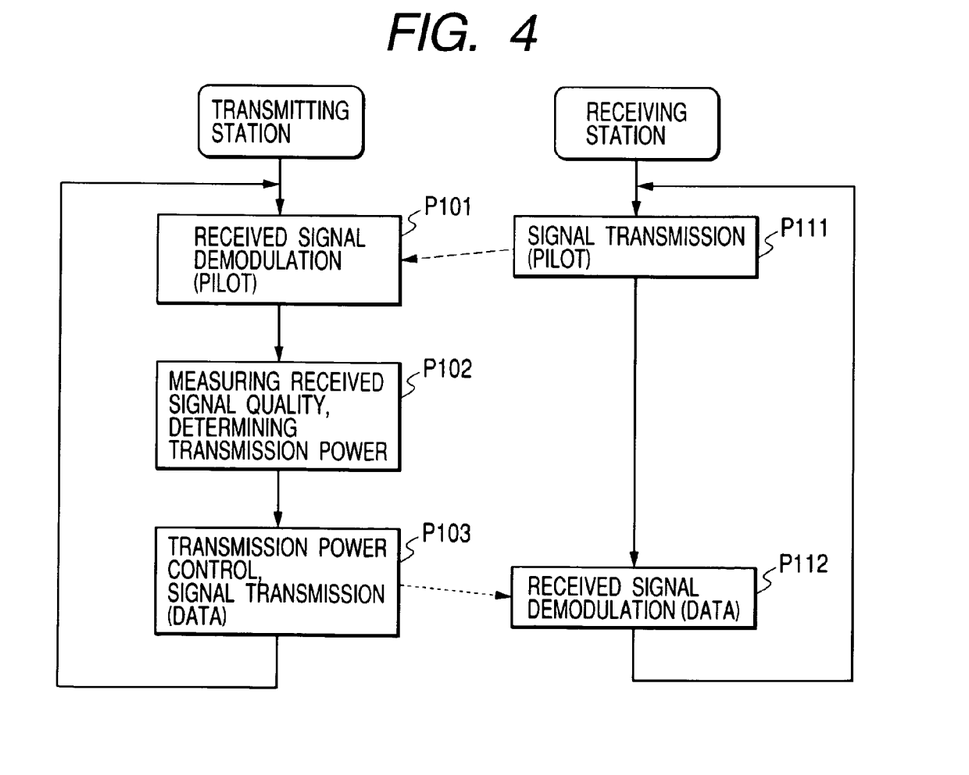
FIG. 4 is a diagram showing an example of the processing flow of a transmitting station and a receiving station in a first embodiment.

FIG. 4 shows an example of power setting processing flow executed by the transmitting station and the receiving station in the first embodiment.

In a processing step P111, the data receiving station first transmits signals including the pilot signal for estimating the channel quality. The signals including the pilot signal are received and demodulated in the processing step P101 of the data transmitting station. Based on the signals received in the processing step P101, the data transmitting station measures the reception quality in a processing step P102 and, based on the measurement result, determines the transmission power of the signal, which will be sent, according to one of the power setting methods described above. In a processing step P103, the data signals are transmitted using the transmission power according to the decision in the processing step P102.

In the processing executed by the transmitting station and the receiving station, the start and the termination of each processing step need not be completed sequentially as shown in the flowchart in FIG. 4. Instead, a sequence of processing may be executed by continuous steps in which messages are transmitted one another.

Figure 5:
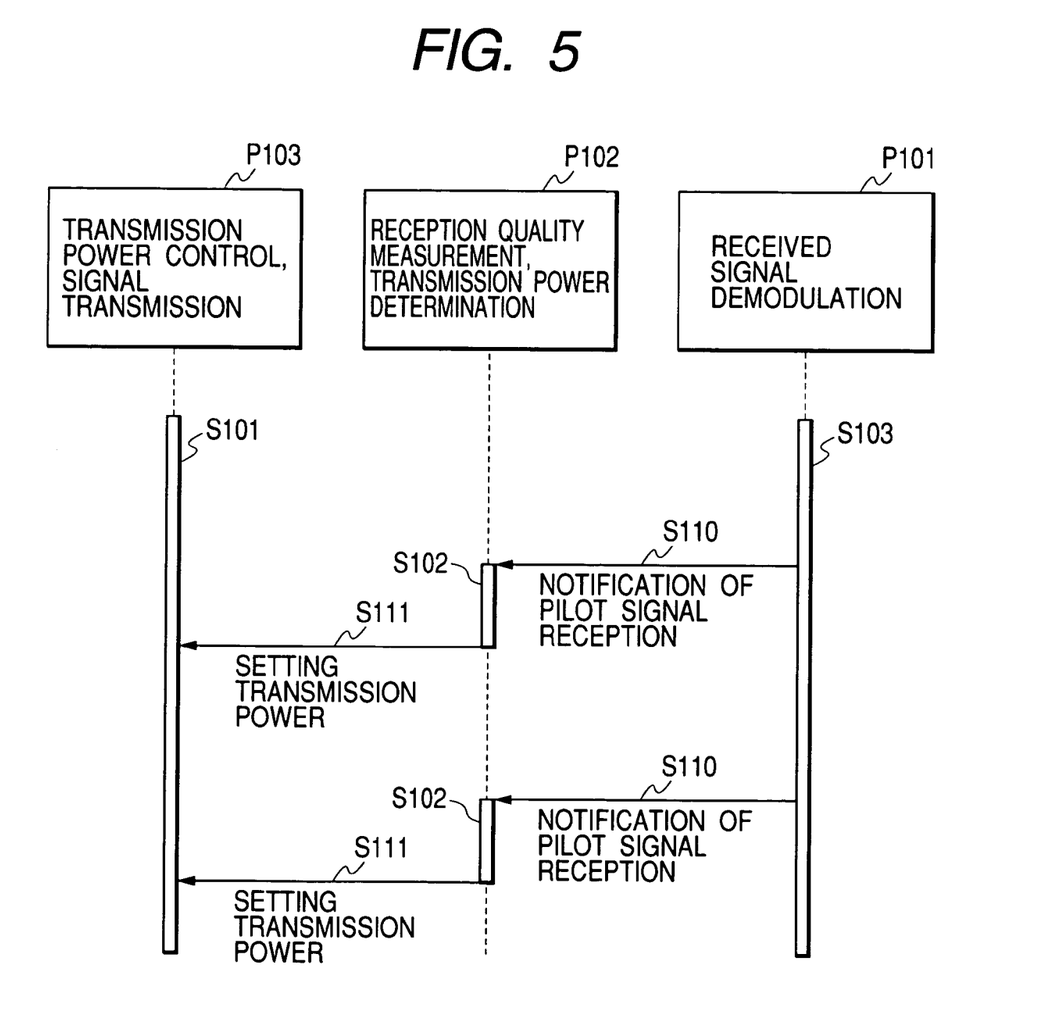
FIG. 5 is a diagram showing an example of the processing sequence of the transmitting station in the first embodiment.

An example of the processing flow executed by the transmitting station during continuous processing will be described with reference to the sequence diagram in FIG. 5. In the processing of the transmit-ting station in FIG. 5, a signal transmission processing step S101 is executed continuously while the signal is being transmitted from the transmitting station to the receiving station and a received signal demodulation processing step S103 is executed continuously while the signal is being transmitted from the receiving station to the transmitting station. In response to a pilot signal usable enough for judging the channel quality, the received-signal demodulation processing step notifies a channel quality judgment processing step P102 of a reception pilot notification message S110 notifying that the pilot signal has been received. In response to the reception pilot notification message, the channel quality judgment processing step starts processing and, when the channel quality is judged, notifies the signal transmission processing step of a transmission power setting message S111 notifying the transmission power to be used to transmit the signal and then terminates processing. In response to the transmission power setting message, the signal transmission processing step can control the transmission signal power to perform signal transmission processing using the power according to the pilot signal received during continuous transmission processing.

Figure 6:
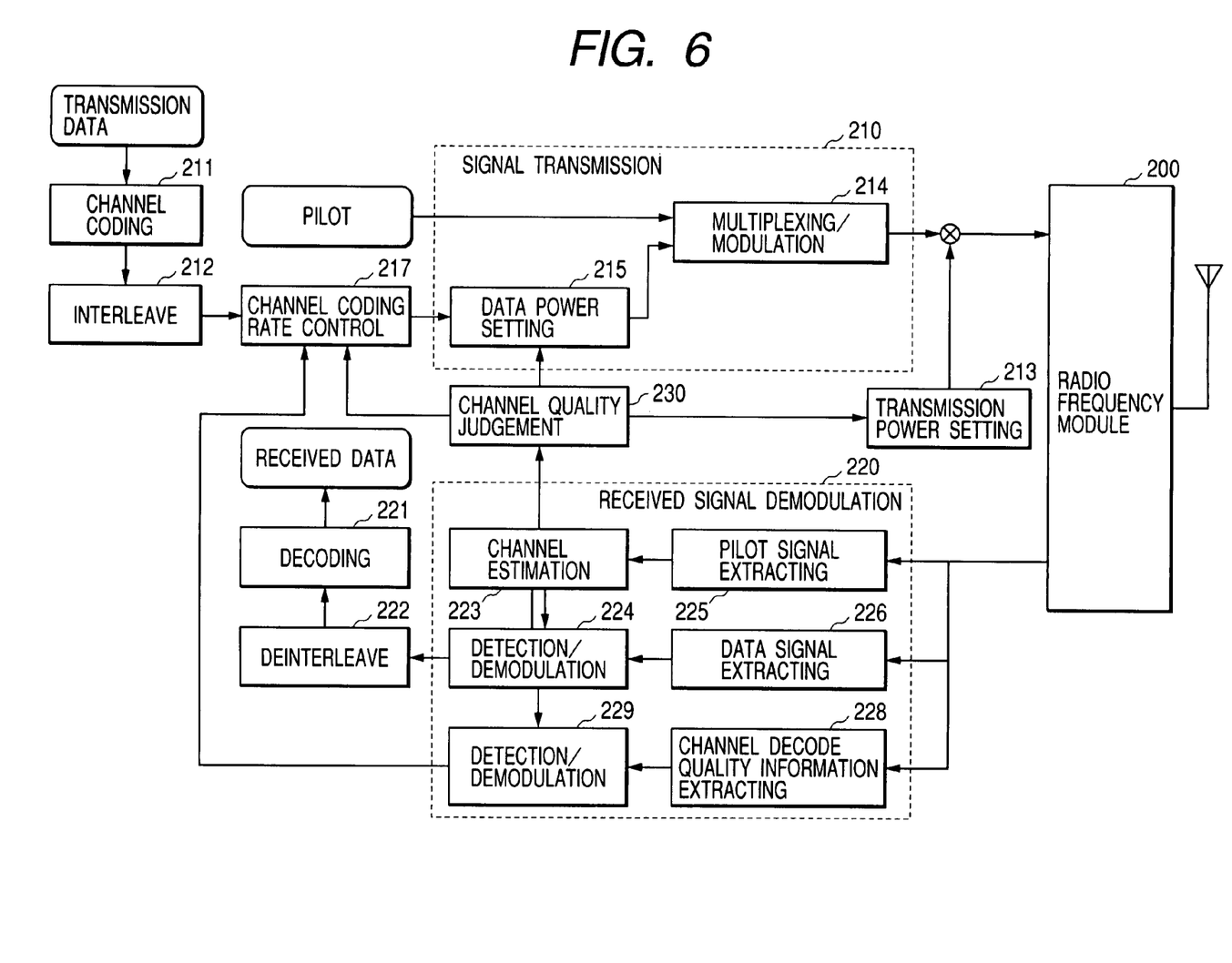
FIG. 6 is a diagram showing an example of the configuration of the transmitting station in the first embodiment.
Figure 7:
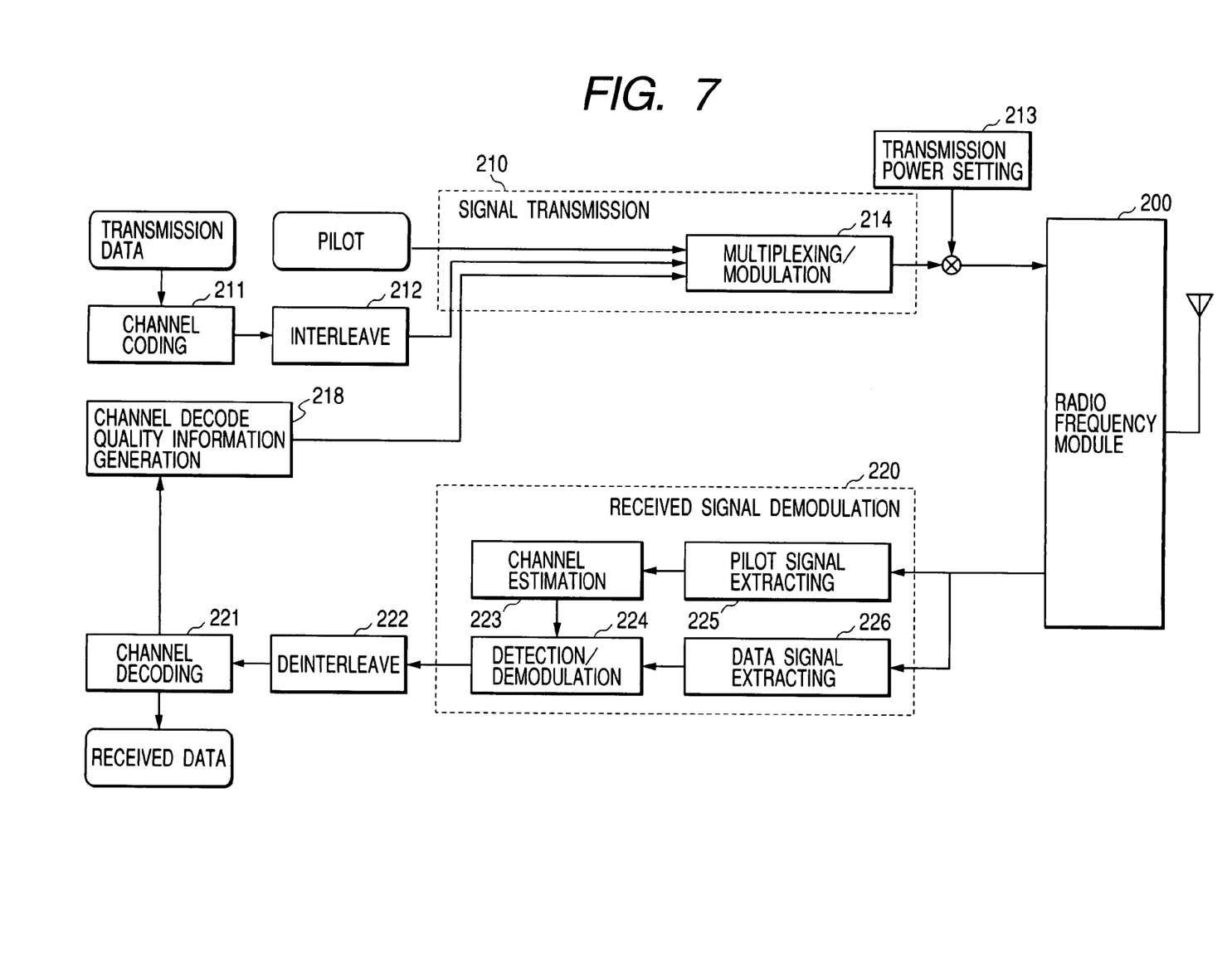
FIG. 7 is a diagram showing an example of the configuration of the receiving station in the first embodiment.

For an embodiment of a radio station for implementing the control in the first embodiment of the present invention, FIG. 6 shows an example of the configuration of a transmitting station and FIG. 7 shows an example of the configuration of a receiving station.

In the transmitting station in FIG. 6, channel coding is performed for transmission data by a channel coding module 211 and then interleave processing is performed by an interleave module 212 to create coded transmission data signals. A part or all of the coded transmission data signals is selected by a channel coding rate control module 217 for transmission to a signal transmission module 210. At this time, when the channel quality notified by a channel quality judgment module 230 is better, a smaller part is selected to increase the coding rate. If the decoding quality notified by a received signal demodulation module indicates a decoding failure, a part of separate or the same signals coded based on the transmission data that is the same as the demodulation-failed signals are selected. If the decoding quality indicates a successful demodulation, a part or all of the signals coded based on transmission data different from successfully decoded signals are selected.

In the signal transmission module 210, the coded transmission data signals are assigned the transmission power for each bandwidth and time, which is output by the channel quality judgment module 230, in a data power setting module 215 and is multiplexed with the pilot signal and then modulated in a multiplexing/modulation module 214 to create base-band transmission signals.

Figure 11:
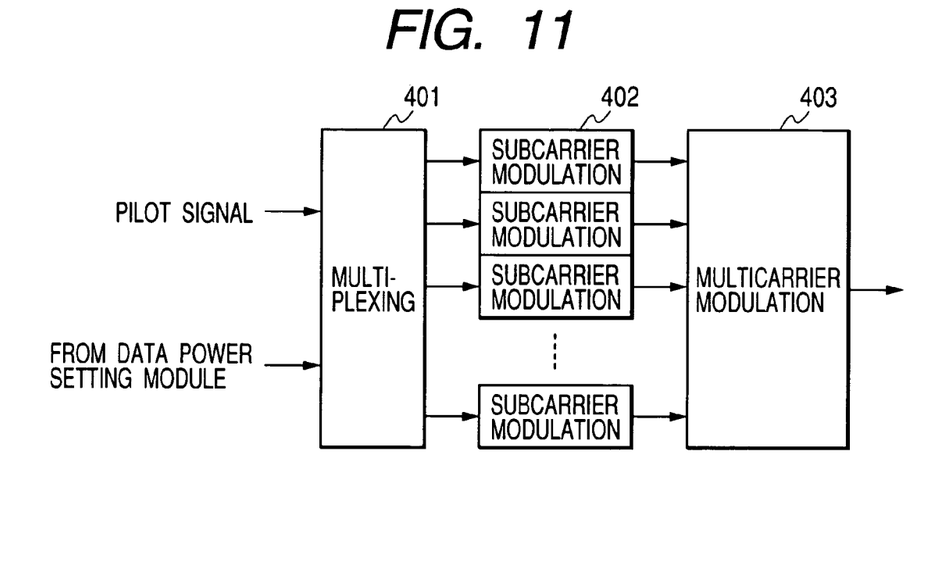
FIG. 11 is a diagram showing an example of the configuration of a multiplexing/modulation module in the transmitting station in the first embodiment.

FIG. 11 shows an example of processing executed by the multiplexing/modulation module 214. The coded word transmission data signals and the pilot signal, to which the transmission power has been allocated by the data power setting module, are multiplexed by a multiplexing module 401, converted to a parallel form, and output to subcarrier modulation modules 402, one subcarrier at a time. In the subcarrier modulation module 402, the QPSK (Quadri-Phase Shift Keying) or QAM (Quadrature Amplitude Modulation) mode is used to modulate the transmission signals for each subcarrier. The signals modulated for the subcarriers are collected into a multicarrier modulation module 403, and frequency-time conversion processing such as inverse-FFT, inverse DFT, and inverse DCT is performed in the multicarrier modulation module 403.

The base-band transmission signals created in the signal transmission module 210 are given an average power, receivable by the receiving station, in a transmission power setting module 213. The signals are converted to radio frequency signals in a radio frequency module 200 and transmitted via an antenna.

Signals received by the transmitting station in FIG. 6 are converted to base-band signals in the radio frequency module 200. The data signals included in the base-band received signals are demodulated in the received signal demodulation module 220 and, as a result of demodulation, received data signals are created. The received data signals are de-interleaved in a deinterleave module 222, and channel decoding is performed in a channel decoding module 221 to create received data.

A channel estimation module 223 measures the channel gain or the noise power of each frequency bandwidth of the base-band received signals and notifies the channel quality judgment module 230 of the measured result as the channel quality. The channel quality judgment module 230 determines the signal power for each bandwidth according to the above-described signal power setting method based on the notified channel quality and notifies the data power setting module 215 of the power to be set for each bandwidth to control the transmission power based on the channel quality.

The decode quality signal included in the base-band received signals and demodulated in the received signal demodulation module 220 is notified to the channel coding rate control module 217.

On the other hand, in the receiving station in FIG. 7, the pilot signal, transmission data coded in the channel coding module 211 and interleaved in the interleave module 212, and a decode quality signal having information created in a channel decode quality information generating module 218 and indicating whether or not decoding was successful are multiplexed and modulated in the signal transmission module 210 by distributing signals to the bandwidths. Those signals are allocated the power, set up in the transmission power setting module, and are transmitted via the radio frequency module 200.

In the receiving station in FIG. 7, radio signals received via the antenna are converted to base-band received signals in the radio frequency module 200. The data signals included in the base-band received signals are demodulated in the received signal demodulation module 220 and, as a result of demodulation, received data signals are created. The received data signals are de-interleaved in the deinterleave module 222, and channel decoding is performed in the channel decoding module 221 to create received data.

At this time, the components of the code word created in the transmitting station from the same transmission data are accumulated and decoded as necessary, a judgment is made whether or not decoding was successful, for example, using CRC (cyclic redundancy check), and the result is notified to the channel decode quality information generating module 218.

Next, the processing flow and the configuration of a second embodiment will be described with reference to the drawings. In this embodiment, a receiving station measures a channel gain from received signals and notifies a transmitting station of the measurement result for use in controlling the transmission signal of the transmitting station.

Figure 8:
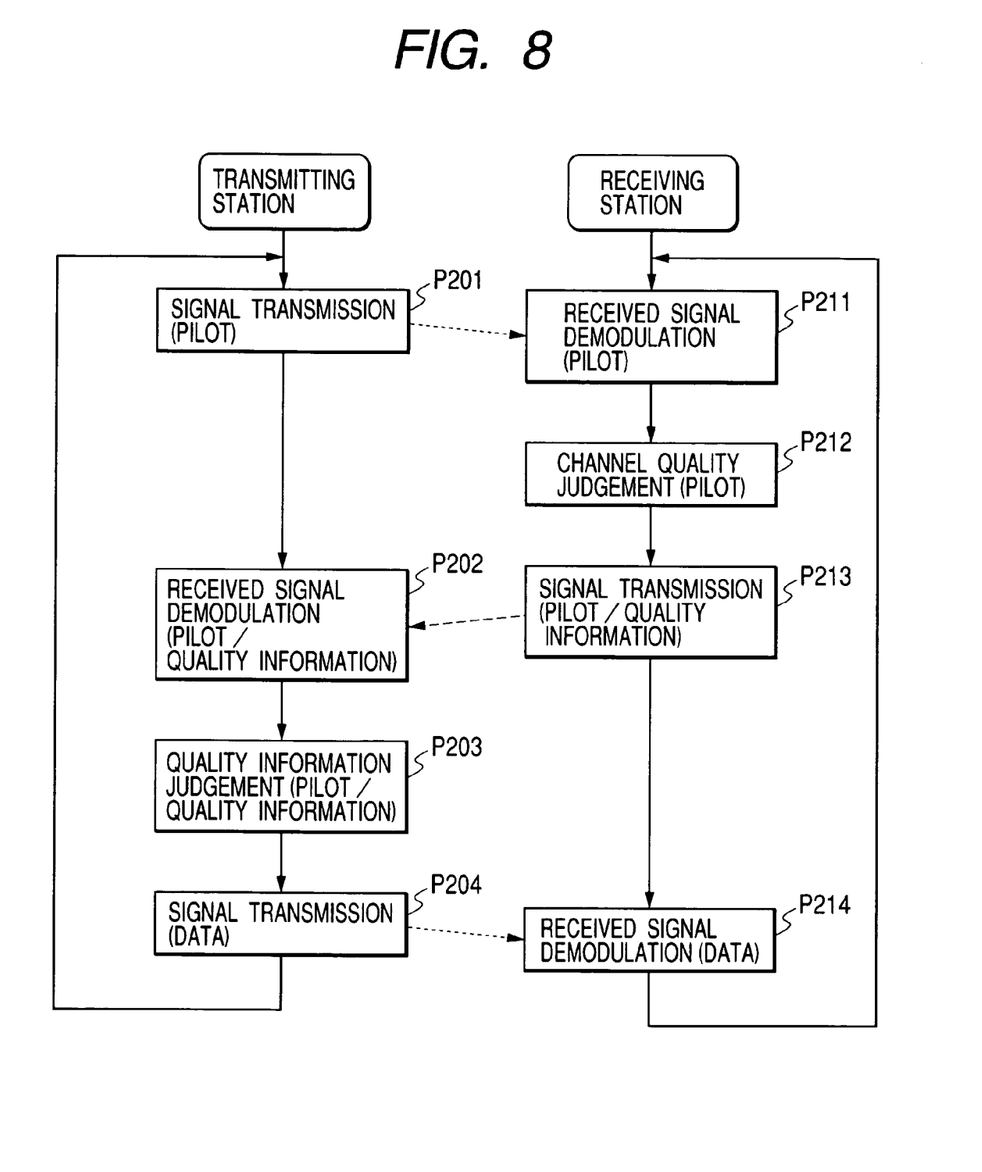
FIG. 8 is a diagram showing an example of the processing flow of a transmitting station and a receiving station in a second embodiment.

FIG. 8 shows an example of the processing flow executed by the transmitting station and the receiving station in the second embodiment.

First, in a processing step P201, the transmitting station transmits signals, including the pilot signal, for estimating the channel quality. The receiving station receives the signals, including the pilot signal, in a received-signal demodulation processing step P211, creates a quality information signal in a channel quality judgment processing step P212 based on the pilot signal, and transmits signals, including the quality information, in a signal transmission processing step P213. Based on the quality information received in a received-signal demodulation processing step P202, the transmitting station judges the channel quality in a quality information judgment processing step P203 and, based on the judgment result, sets the signal power according to the signal power setting method described above, and then transmits data in a processing step P204.

The quality information transmitted in the signal transmission processing step P213 may be relation information relative to the pilot signal such as a power amount relation or a phase difference. In this case, the receiving station transmits the quality information and the signals, including the pilot signal, in the signal transmission processing step P213, and the transmitting station receives the quality information and the pilot signal in the received-signal demodulation processing step 202 and judges the channel quality based on the relative relation between the quality information and the pilot signal in the quality information judgment processing step P203.

In the processing executed by the transmitting station and the receiving station, the start and the termination of each processing step need not be completed sequentially as shown in the flowchart in FIG. 8. Instead, a sequence of processing steps may be executed by continuous steps in which messages are transmitted one another.

Figure 9:
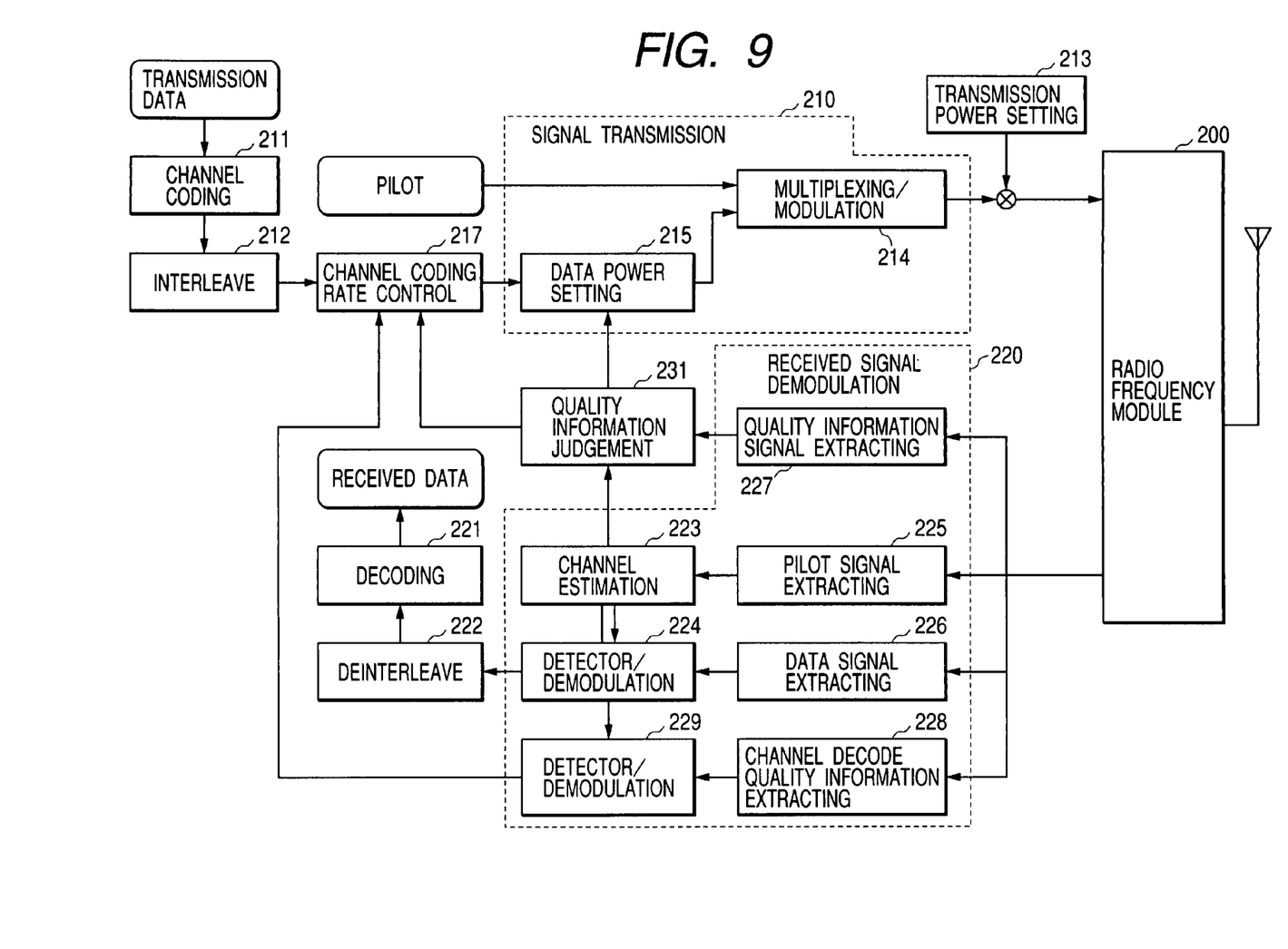
FIG. 9 is a diagram showing an example of the configuration of the transmitting station in the second embodiment.
Figure 10:
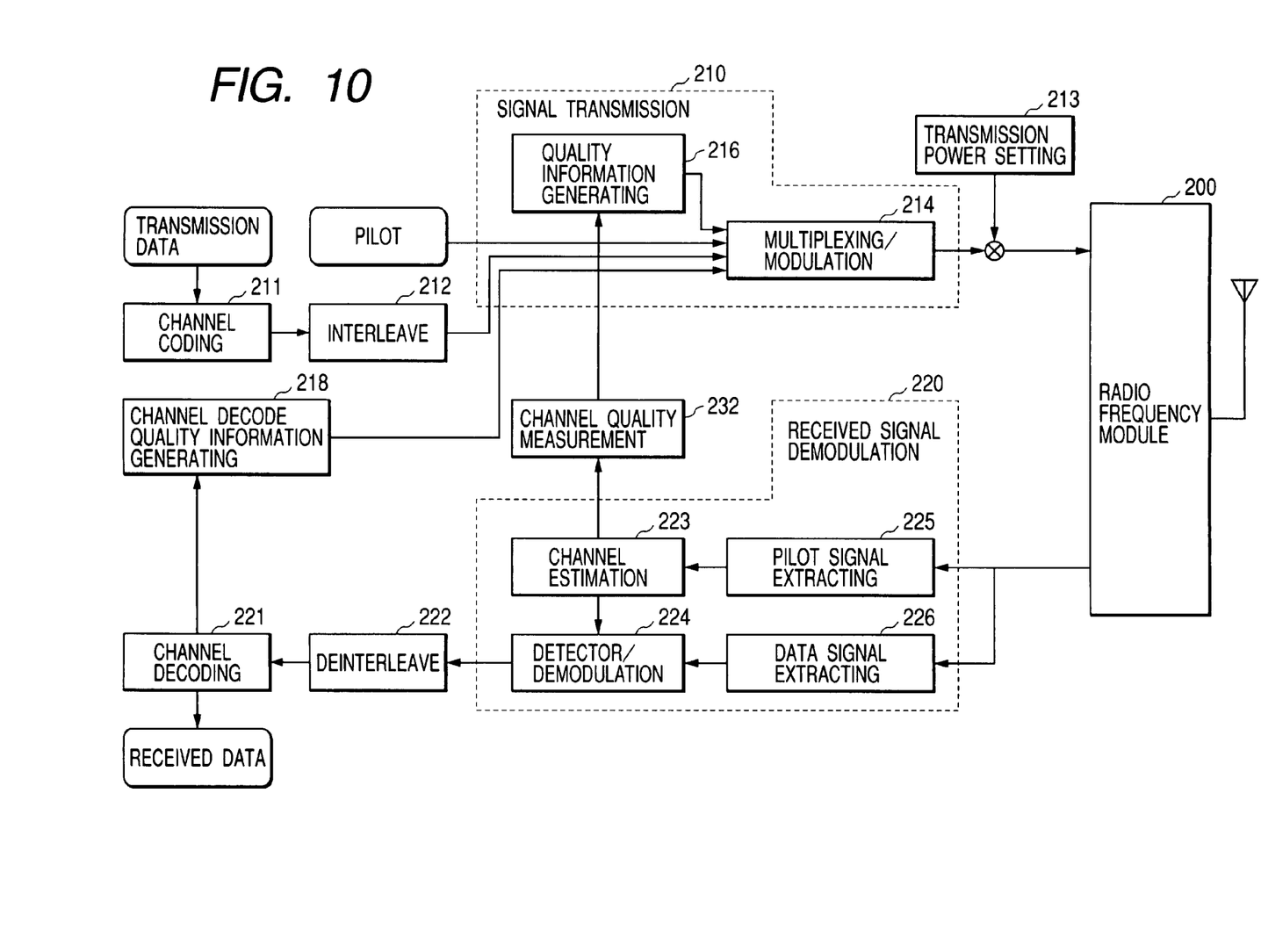
FIG. 10 is a diagram showing an example of the configuration of the receiving station in the second embodiment.

FIG. 9 shows an example of the configuration of a transmitting station and FIG. 10 shows an example of the configuration of a receiving station in an embodiment of a radio station to implement the control in a second embodiment of the present invention.

Because processing for data signals and the decode quality signal is the same as that in the first embodiment, only processing for the pilot signal and the quality information signal, which are different from those in the first embodiment, will be described below.

In the transmitting station in FIG. 9, channel coding is performed for transmission data by a channel coding module 211 and then interleave processing is performed by an interleave module 212 to create coded transmission data signals. A part or all of the coded transmission data signals is selected by a channel coding rate control module 217 for transmission to a signal transmission module 210. At this time, when the channel quality notified by a quality information judgment module 231 is better, a smaller part is selected to increase the coding rate. If the decoding quality notified by a received signal demodulation module indicates a decoding failure, a part of separate or the same signals coded based on the transmission data that is the same as the decoding-failed signals are selected. If the decoding quality indicates a successful decoding, a part or all of the signals coded based on transmission data different from successfully decoded signals are selected.

In the signal transmission module 210, the coded word transmission data signals are assigned the transmission power for each bandwidth and time, which is output by the quality information judgment module 231, in a data power setting module 215 and is multiplexed with the pilot signal and then modulated in a multiplexing/modulation module 214 to create base-band transmission signals.

The base-band transmission signals created in the signal transmission module 210 are given an average power, receivable by the receiving station, in a transmission power setting module 213. The signals are converted to radio frequency signals in a radio frequency module 200 and transmitted via an antenna.

Signals received by the transmitting station in FIG. 9 are converted to base-band signals in the radio frequency module 200. The data signals included in the base-band received signals are demodulated in the received signal demodulation module 220 and, as a result of demodulation, received data signals are created. The received data signals are de-interleaved in a deinterleave module 222, and channel decoding is performed in a channel decoding module 221 to create received data.

The channel gain or the noise power of each frequency bandwidth measured by the channel estimation module 223 from the base-band received signals and the quality information extracted by a quality information signal extracting module 227 are notified to the quality information judgment module 231. The quality information judgment module 231 determines the signal power for each bandwidth according to the above-described signal power setting method based on the notified channel quality and the quality information and notifies the data power setting module 215 of the power to be set for each bandwidth to control the transmission power based on the channel quality.

Also, the channel estimation module 223 measures the channel gain or the noise power from the base-band received signals and notifies the quality information judgment module 231 of the measured result as the channel quality. The quality information judgment module 231 determines the signal power for each bandwidth according to the above-described signal power setting method based on the notified channel quality and notifies the data power setting module 215 of the power to be set for each bandwidth to control the transmission power based on the channel quality.

The channel quality judgment result is notified to the data power setting module 215 to control the transmission power based on the channel quality.

The decode quality signal included in the base-band received signals and demodulated in the received signal demodulation module 220 is notified to the channel coding rate control module 217.

On the other hand, in the receiving station in FIG. 10, the pilot signal, transmission data coded in the channel coding module 211 and interleaved in the interleave module 212, a decode quality signal having information created in a channel decode quality information generating module 218 and indicating whether or not decoding was successful, and a quality information signal judged based on the received pilot signal and created in a quality information generating module 216 are multiplexed and modulated in the signal transmission module 210. Those signals are then allocated the power set up in the transmission power setting module and are transmitted via the radio frequency module 200.

In the receiving station in FIG. 10, radio signals received via the antenna are converted to base-band received signals in the radio frequency module 200. The data signals included in the base-band received signals are demodulated in the received signal demodulation module 220 and, as a result of demodulation, received data signals are created. The received data signals are de-interleaved in the deinterleave module 222, and channel decoding is performed in the channel decoding module 221 to create received data.

At this time, the components of the code word created in the transmitting station from the same transmission data are accumulated and decoded as necessary, a judgment is made whether or not decoding was successful, for example, using CRC (cyclic redundancy check), and the result is notified to the channel decode quality information generating module 218.

The channel gain or the noise power measured by the channel estimation module 223 from the base-band received signals and the quality information extracted by the quality information signal extracting module 227 are notified to a channel quality measuring module 232. The channel quality measuring module 232 creates information, used to notify the transmitting station of the channel quality measured based on the notified channel quality, and notifies the quality information generating module 216 of the channel quality measurement result.

In the first and second embodiments, it is desirable that a code used for coding by the channel coding module 211 and for decoding by the channel decoding module 221 be a channel code having a high error-correction capability. For example, a convolution code decodable by applying the Viterbi Algorithm or a Turbo code that can increase the error correction capability by a repetition coding scheme may be used.

The system according to the present invention sets up a power for a bandwidth and a time so that the communication channel capacity is increased, thus decreasing the required transmission power on average and reduces interference among communications.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A wireless communication system transmitting data from a transmitting station to a receiving station using a plurality of subcarriers in parallel, wherein said transmitting station comprises:

a channel quality judgment module judging the quality of a channel between said transmitting station and said receiving station for each of said plurality of subcarriers;

a channel coding module coding data signals into a code word with an error correcting code;

a subcarrier modulation module dividing the code word into a plurality of subcarriers for modulation and modulating the subcarriers each composed of a plurality of symbols;

a multi-carrier modulation module combining the plurality of subcarrier-modulated symbols into transmission signals via frequency-time conversion; and a data power setting module setting a transmission power for each of the plurality of subcarriers according to an output from said channel quality judgment module, wherein said receiving station comprises:

a demodulation module demodulating signals received from said transmitting station; and a channel decoding module decoding the demodulated received signals, and wherein the transmission power is determined by a first control rule stipulating that, for the plurality of symbols made from a same code word, a transmission power for symbols corresponding to a first subcarrier whose channel quality is judged to be good is set higher than a transmission power for symbols corresponding to a second subcarrier whose channel quality is judged to be poor.

2. The wireless communication system according to claim 1, wherein said channel quality judgment module judges the channel quality based on a received power of signals transmitted from said receiving station to said transmitting station.

3. The wireless communication system according to claim 1, wherein said receiving station further comprises a channel quality measuring module, wherein said channel quality measuring module measures the channel quality based on an output of said demodulation module demodulating signals transmitted from said transmitting station to said receiving station, wherein said receiving station notifies said transmitting station of the measurement result, and wherein said channel quality judgment module judges the channel quality based on the measurement result.

4. The wireless communication system according to claim 1, wherein the coding rate of the code word is changed according to the channel quality.

5. The wireless communication system according to claim 1, wherein said channel quality judgment module determines a reference power based on a noise power for signals transmitted via a plurality of subcarriers between said transmitting station and said receiving station and outputs a value, generated by subtracting the noise power in each subcarrier from the reference power, as a signal transmission power and wherein the reference power is determined by a second control rule stipulating that the reference power is equal in each code word.

6. The wireless communication system according to claim 5, wherein the reference power of a first code word transmitted when the total of the noise power is high is set larger than the reference power of a second code word transmitted when the total of the noise power is low.

7. The wireless communication system according to claim 5, wherein the reference power is a value common to a plurality of continuous code words.

8. A data transmission control method for use by a transmitting station in a wireless communication system transmitting data from the transmitting station to a receiving station using a plurality of subcarriers in parallel, said method comprising the steps of:

judging the quality of a channel between said transmitting station and said receiving station for each of said plurality of subcarriers;

coding, by said transmitting station, data signals, which is to be transmitted to said receiving station, for generating a code word with an error correcting code;

dividing the code word into a plurality of subcarriers for modulation and generating a plurality of symbols;

combining the plurality of symbols into transmission signals via frequency-time conversion; and setting a transmission power for each of the plurality of subcarriers according to the judged channel quality and transmitting the transmission signals to said receiving station, wherein the transmission power is determined by a first control rule stipulating that, for the plurality of symbols made from a same code word, a transmission power for symbols corresponding to a first subcarrier whose channel quality is judged to be good is set higher than a transmission power for symbols corresponding to a second subcarrier whose channel quality is judged to be poor.

9. The data transmission control method according to claim 8, wherein the channel quality is judged based on a received power of signals transmitted from said receiving station to said transmitting station.

10. The data transmission control method according to claim 8, wherein the channel quality is measured by said receiving station and is notified to said transmitting station.

11. The data transmission control method according to claim 8, wherein the channel quality is judged using a reception-to-noise ratio power of signals transmitted between said transmitting station and said receiving station.

12. The data transmission control method according to claim 8, wherein the transmission power is a value generated by subtracting a noise power in each subcarrier from the reference power determined based on the noise power for signals transmitted via a plurality of subcarriers between said transmitting station and said receiving station and the reference power is determined by a second control rule stipulating that the reference power is equal in each code word.

13. The data transmission control method according to claim 12, wherein the reference power of a first code word transmitted when the total of the noise power is high is larger than the reference power of a second code word transmitted when the total of the noise power is low.

14. The data transmission control method according to claim 12, wherein the reference power is a value updated for each a plurality of code words.

15. The data transmission control method according to claim 8,
wherein when the channel quality is higher than a predetermined criterion, the transmission power is set lower than a transmission power used when the channel quality is the predetermined criterion.

16. The data transmission control method according to claim 8,
wherein the coding rate of the code word is controlled according to the channel quality.

17. A transmitting station transmitting data to a receiving station using a plurality of subcarriers in parallel, comprising:
a channel quality judgment module judging the quality of a channel between said transmitting station and said receiving station for each of said plurality of subcarriers;
a channel coding module coding data signals into a code word with an error correcting code;
a subcarrier modulation module dividing the code word into a plurality of subcarriers for modulation and modulating the subcarriers each composed of a plurality of symbols;
a multi-carrier modulation module performing frequency-time conversion for the plurality of subcarrier-modulated symbols to generate transmission signals; and
a data power setting module setting a transmission power for each of the plurality of subcarriers according to an output from said channel quality judgment module, and wherein the transmission power is determined by a first control rule stipulating that, for the plurality of symbols made from a same code word, a transmission power for symbols corresponding to a first subcarrier whose channel quality is judged to be good is set higher than a transmission power for symbols corresponding to a second subcarrier whose channel quality is judged to be poor.

18. The transmitting station according to claim 17,
wherein said channel quality judgment module judges the channel quality based on a received power of signals transmitted from said receiving station to said transmitting station.

19. The transmitting station according to claim 18, wherein
said channel quality judgment module judges the channel quality based on reception quality information in said receiving station notified by said receiving station.

20. The transmitting station according to claim 17,
wherein said channel quality judgment module determines a reference power based on a noise power for signals transmitted via a plurality of subcarriers between said transmitting station and said receiving station and outputs a value, generated by subtracting the noise power in each subcarrier from the reference power, as a signal transmission power and
the reference power is determined by a second control rule stipulating that the reference power is equal in each code word.

* * * * *